Jan. 14, 1969 R. LA ROSA 3,422,378
COMPENSATING MEANS FOR MINIMIZING UNDESIRABLE VARIATIONS IN THE AMPLITUDE OF A REFLECTED WAVE
Filed Oct. 19, 1965
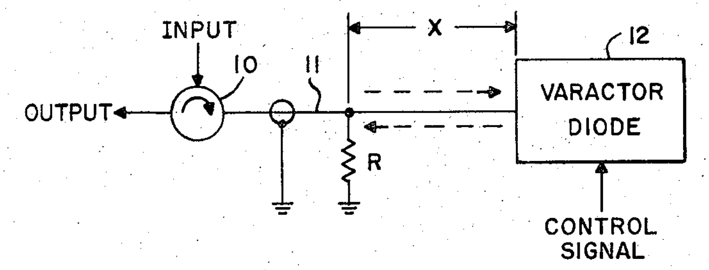
FIG. 1
| | | DISTANCE X | |
|---|---|---|---|
| | | $X_2$ | $X_1$ |
| VOLTAGE | MINIMUM | $C_{j2}$ | $C_{j1}$ |
| VOLTAGE | NON-MINIMUM | $C_{j1}$ | $C_{j2}$ |
FIG. 2
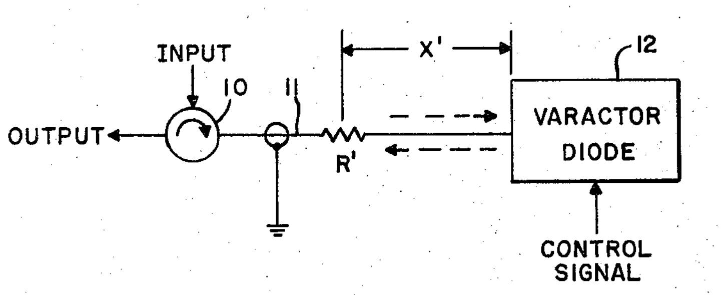
FIG. 3

United States Patent Office 3,422,378

Patented Jan. 14, 1969

3,422,378

COMPENSATING MEANS FOR MINIMIZING UNDESIRABLE VARIATIONS IN THE AMPLITUDE OF A REFLECTED WAVE

Richard La Rosa, South Hempstead, N.Y., assignor to Hazeltine Research, Inc., a corporation of Illinois Filed Oct. 19, 1965, Ser. No. 497,889

U.S. Cl. 333—28 7 Claims

Int. Cl. H03h 5/00; 7/38

ABSTRACT OF THE DISCLOSURE

Disclosed is apparatus capable of compensating for variations in the amplitude of the output reflected wave signal of a varactor diode phase shifter, for example, caused by the variable loss characteristic of the varactor. Compensation is achieved by coupling a resistance in the transmission line feeding the varactor, at a point where a voltage or current null exists when the varactor loss is at a relative maximum. Other embodiments are covered.

In general, the present invention is concerned with wave signal apparatus. More particularly, the invention concerns a compensating means which is included in such apparatus to provide compensation for an otherwise variable loss characteristic of the apparatus.

In prior art, it is common practice to use wave signal apparatus consisting of a transmission network coupled at one end to a circulator and terminated at the other end in a variable impedance device, such as a varactor diode, to serve as a phase shifter, for example. As the impedance of the device is varied, the reflection coefficient ($\rho$) of the termination varies accordingly. In this manner, an incident wave signal traveling toward the termination on the transmission network is reflected therefrom with a phase shift determined by the reflection phase angle of the termination. Until now, the inherent drawback of this type system has been the fact that loss in the variable impedance device varied with variations in its impedance. This, in effect, caused amplitude modulation of the reflected signal in accordance with variations in the magnitude of the reflection coefficient of the termination, which is a highly undesirable effect.

It is therefore an object of the present invention to provide wave signal apparatus of the type described wherein a compensating means is included to minimize said amplitude modulation.

It is another object of the present invention to provide wave signal apparatus of the type described, wherein a resistance is coupled in the transmission network at a predetermined point to provide compensation for the variable loss characteristic of the variable impedance device.

In accordance with the present invention wave signal apparatus comprises a variable impedance device having a loss characteristic which varies with variations in the impedance of the device and a transmission network for supplying an incident wave signal to the device and for conveying a reflected wave signal therefrom, the level of the reflected wave signal being undesirably attenuated in accordance with the varying loss characteristic of the device. The wave signal apparatus also includes compensating means coupled in the transmission network and jointly responsive to the incident and reflected wave signals for producing an attenuation of the reflected wave signal which varies inversely with the attenuation caused by the varying loss characteristic of the device, thereby developing an output reflected wave signal wherein undesirable variations in level are minimized.

For a better understanding of the present invention together with other and further objects thereof, reference is had to the following description taken in connection with the accompanying drawing, and its scope will be pointed out in the appended claims.

Referring to the drawing:

FIG. 1 is a diagram, partly schematic, of wave signal apparatus embodying the invention in one form;

FIG. 2 is a table of values helpful in explaining the operation of the wave signal apparatus of FIG. 1; and FIG. 3 is a diagram, partly schematic, of wave signal apparatus embodying the invention in another form.

DESCRIPTION OF THE APPARATUS OF FIG. 1

In FIG. 1 of the drawing there is shown a typical embodiment of wave signal apparatus constructed in accordance with the present invention. Basically, the apparatus of FIG. 1 is a conventional varactor diode phase shifter consisting of a circulator 10 coupled to one end of a transmission network 11, which is terminated at the other end in a variable impedance device, in this case a varactor diode 12. While transmission network 11 is shown schematically as a single line in FIG. 1, it will be understood to represent any suitable transmission path for supplying an incident wave signal to the varactor and for conveying a reflected wave signal therefrom, such as coaxial cable, waveguide, stripline, lumped network, etc.

In the apparatus of FIG. 1, varactor diode 12 has a loss characteristic which varies between a relative minimum value and a relative maximum value when the junction capacitance of the diode is varied correspondingly between a first capacitance and a second capacitance. This variation in the loss characteristic of diode 12 causes the reflected wave signal to be variably attenuated in a corresponding manner. That is, when the loss characteristic of diode 12 is at a maximum value, the reflected wave signal will exhibit a maximum attenuation, and likewise when the loss characteristic of diode 12 is at a minimum, the reflected wave signal will exhibit a minimum attenuation.

In accordance with the present invention, however, there is also included in the wave signal apparatus of FIG. 1, compensating means, which in this case is the resistance (R), coupled at a predetermined point in transmission network 11 for minimizing the undesirable effect of the variable loss characteristic of varactor 12 on the reflected wave signal. As mentioned previously, this undesirable effect is the variable attenuation of the reflected wave signal due to variations in the loss characteristic of diode 12, resulting from changes in the diode's junction capacitance. More specifically, resistance (R) is coupled between transmission network 11 and ground at a point X units from the effective location of the diode junction. In the embodiment of FIG. 1, the diode junction is assumed to be directly at the terminated end of transmission network 11 for ease of illustration. In an actual circuit, however, those skilled in the art will be readily able to determine the actual location of the diode junction, since this depends on the physical configuration of the particular diode and diode mount used.

OPERATION OF THE APPARATUS OF FIG. 1

The operating principles of a varactor diode phase shifter of the type shown in FIG. 1, are well known and will not be described in detail herein. Generally, however, a wave signal is supplied via an input of circulator 10 to transmission network 11. This incident wave signal is shown in FIG. 1 as a dashed arrow pointing toward varactor diode 11, since the incident wave signal propagates toward the diode along the transmission network. The incident wave signal is reflected by varactor diode 12 in accordance with the reflection coefficient ($\rho$) presented by the diode termination, thus undergoing a phase shift dependent upon the reflection phase angle $\theta$, where:

$$\rho = K\angle\theta \qquad (1)$$

Likewise, in the illustration of FIG. 1 the reflected wave signal is shown as a dashed arrow pointing away from the varactor diode. Those skilled in the art will recognize the fact that the incident and reflected wave signals combine to form a standing wave pattern in the transmission network 11. The reflected wave signal is eventually separated from the incident wave signal by circulator 10 in a conventional manner, and is presented at the output of the circulator.

Since the impedance of the varactor diode may be varied by varying a bias control signal supplied thereto, then, the reflection coefficient ($\rho$) will vary accordingly, thereby providing a controlled variable phase shift of the reflected signal.

Ideally, in such a phase shifter, any variation in the reflection coefficient ($\rho$) should involve only a variation in the phase angle ($\theta$) thereof, and not a variation in the magnitude (K), since a variation in the magnitude (K) will cause a corresponding amplitude variation in the reflected signal. However, due to the presence of series resistance in the varactor diode, loss in the diode will vary with variations in its junction capacitance, causing attendant variations in the magnitude (K) of the reflection coefficient presented by the diode. In accordance with one aspect of the present invention, however, this variation in loss within the diode may be compensated for in an exceedingly simple manner by shunting a resistance (R) across the transmission network at a distance (X) units from the diode junction, where (X) is measured in units of the wavelength ($\lambda$) of the incident wave signal.

In describing now the operation of the present invention, it will be assumed that the junction capacitance ($C_j$) of diode 11 may be varied from a first value ($C_{j1}$) to a second value ($C_{j2}$), where $C_{j1}<C_{j2}$, presenting reflection coefficients of $[\rho_1=K_1\angle\theta_1]$ and $[\rho_2=K_2\angle\theta_2]$ respectively, where $K_1>K_2$; $\theta_1<\theta_2$.

When the diode junction capacitance is ($C_{j2}$), diode loss is greatest as indicated by the reflection coefficient ($\rho_2$) since $K_2<K_1$. At this reflection coefficient ($\rho_2$), those skilled in the art will recognize that a voltage minimum exists in the standing wave pattern in transmission network at a distance ($X_2+n2\pi$) from the diode 11, assuming a frequency ($f$) and corresponding wavelength ($\lambda$) for the incident wave signal, where:

$$X_2\frac{[180°+\theta_2]\lambda}{720°} \qquad (2)$$

If a resistance (R) is shunted across the transmission network at the distance ($X_2$) from the diode, for example, it will have little effect so long as the reflection coefficient ($\rho_2$) remains the same. However, it will be appreciated that as that diode junction capacitance swings to ($C_{j1}$), and the reflection coefficient to $[\rho_1=K_1\angle\theta_1]$, diode loss decreases, and at the same time, the voltage minimum in transmission network 11 moves away from point ($X_2$) to ($X_1$) as shown in the table of FIG. 2, where:

$$X_1=\frac{[180°+\theta_1]\lambda}{720°} \qquad (3)$$

Since there is no longer a voltage minimum at point ($X_2$), resistance (R) becomes effective in providing loss. Thus, while diode loss decreases in going from ($C_{j2}$) to ($C_{j1}$), the loss provided by shunt resistance (R) increases. By proper selection of the resistance (R), the increasing attenuation of the reflected wave signal produced by the resistance may be made to compensate for the decreasing loss in the diode. Thus, the effective reflection coefficient produced by the diode acting in conjunction with the shunt resistance (R), will have a substantially constant magnitude (K), and undesirable amplitude variation in the final reflected wave signal appearing at the output of circulator 10 will be minimized.

In accordance with another embodiment of the present invention shown in FIG. 3, it will be appreciated that the same form of loss compensation can be obtained by coupling a resistance (R′) in series with the transmission network at a point where a current minimum exists in the standing wave pattern when the variable impedance device is providing maximum loss. Just as described above for the shunt resistance-voltage minimum case, here also, as the reflection coefficient ($\rho$) of the termination is varied, likewise, the current minimum will move away from the series resistance (R′) thus permitting the resistance to compensate for the decreasing loss in the variable impedance device. By proper selection of the series resistance (R′) the increasing attenuation of the reflected wave signal produced by the resistance, as the current minimum moves away from it, may be made to compensate for the decreasing loss in the diode. Thus, here again the effective reflection coefficient produced by the diode acting in conjunction with the series resistance, will have a substantially constant magnitude (K), and undesirable amplitude variation in the final reflected wave signal appearing at the output of the circulator will be minimized.

While there have been described what are at present considered to be the preferred embodiments of this invention, it will be obvious to those skilled in the art that various changes and modifications may be made therein without departing from the invention and it is, therefore, aimed to cover all such changes and modifications as fall within the true spirit and scope of the invention.

What is claimed is:

1. Wave signal apparatus, comprising:

a variable impedance device having a loss characteristic which varies with variations in the impedance of said device;

a transmission network for supplying an incident wave signal to said device and for conveying a reflected wave signal therefrom, the level of said reflected wave signal being undesirably attenuated in accordance with the varying loss characteristic of said device;

and compensating means coupled in said transmission network and jointly responsive to said incident and reflected wave signals for producing an attenuation of said reflected wave signal which varies inversely with the attenuation caused by the varying loss characteristic of said device, thereby developing an output reflected wave signal wherein undesirable variations in level are minimized.

2. Wave signal apparatus constructed in accordance with claim 1 wherein said incident and reflected wave signals combine to establish a standing wave in said transmission network which varies in accordance with variations in the impedance of said device, and wherein said compensating means is responsive to variations in the standing wave for producing said attenuation of the reflected wave signal.

3. Wave signal apparatus constructed in accordance with claim 2, wherein said compensating means is solely resistive in nature and is coupled at a predetermined point in said transmission network so as to be responsive to the standing wave pattern at said point, and wherein said output reflected wave signal is of a substantially uniform level, regardless of variations in the loss characteristic of said device.

4. Apparatus constructed in accordance with claim 3 wherein said resistive means is a single resistance coupled at said predetermined point between said transmission network and ground.

5. Apparatus constructed in accordance with claim 3 wherein said resistive means is a single resistance coupled at said predetermined point in series with said transmission network.

6. Apparatus constructed in accordance with claim 4 wherein said resistance is coupled in said transmission network at a predetermined point where a voltage minimum exists in said standing wave when the loss characteristic of said device is at a maximum.

7. Apparatus constructed in accordance with claim 5 wherein said resistance is coupled in said transmission network at a predetermined point where a current minimum exists in said standing wave when the loss characteristic of said device is at a maximum.

References Cited

UNITED STATES PATENTS

| | | | |
|---|---|---|---|
| 2,485,029 | 10/1949 | Bradley | 333—28 X |
| 3,204,198 | 8/1965 | Bachnick. | |

HERMAN KARL SAALBACH, *Primary Examiner.*

PAUL L. GENSLER, *Assistant Examiner.*

U.S. Cl. X.R.

333—31